US008549616B2

(12) United States Patent
Gerber et al.

(10) Patent No.: US 8,549,616 B2
(45) Date of Patent: Oct. 1, 2013

(54) METHODS AND APPARATUS TO DYNAMICALLY CONTROL ACCESS FROM VIRTUAL PRIVATE NETWORKS TO NETWORK-BASED SHARED RESOURCES

(75) Inventors: Alexandre Gerber, Madison, NJ (US); Carsten Lund, Berkeley Hts, NJ (US); Jacobus Van der Merwe, Newprovidence, NJ (US); Michael Satterlee, Clifton Park, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1077 days.

(21) Appl. No.: 12/262,615

(22) Filed: Oct. 31, 2008

(65) Prior Publication Data

US 2010/0115604 A1 May 6, 2010

(51) Int. Cl.
*H04L 29/06* (2006.01)
(52) U.S. Cl.
USPC .......................................................... 726/15
(58) Field of Classification Search
USPC .......................................................... 726/15
See application file for complete search history.

(56) References Cited

U.S. PATENT DOCUMENTS

| 5,623,601 | A  | * | 4/1997  | Vu ................................. | 726/12   |
|-----------|----|---|---------|--------------------------------------|----------|
| 6,079,020 | A  | * | 6/2000  | Liu ............................... | 726/15   |
| 6,205,488 | B1 | * | 3/2001  | Casey et al. ................... | 709/238  |
| 6,636,898 | B1 | * | 10/2003 | Ludovici et al. .............. | 709/250  |
| 6,781,982 | B1 | * | 8/2004  | Borella et al. ................. | 370/352  |
| 7,072,346 | B2 | * | 7/2006  | Hama ...................... | 370/395.53 |
| 7,075,933 | B2 | * | 7/2006  | Aysan ...................... | 370/395.31 |
| 7,131,141 | B1 | * | 10/2006 | Blewett et al. .................. | 726/12   |
| 7,185,106 | B1 | * | 2/2007  | Moberg et al. ................ | 709/238  |
| 7,221,675 | B2 | * | 5/2007  | Bryden et al. ................ | 370/392  |
| 7,225,270 | B2 | * | 5/2007  | Barr et al. ..................... | 709/238  |
| 7,340,519 | B1 | * | 3/2008  | Golan et al. .................. | 709/225  |
| 7,366,188 | B2 | * | 4/2008  | Kim ............................. | 370/401  |
| 7,388,844 | B1 | * | 6/2008  | Brown et al. ................. | 370/252  |
| 7,400,611 | B2 | * | 7/2008  | Mukherjee et al. ........... | 370/338  |
| 7,564,802 | B2 | * | 7/2009  | Andrapalliyal et al. ...... | 370/254  |
| 7,616,574 | B2 | * | 11/2009 | Previdi et al. ................. | 370/238  |
| 7,870,604 | B1 | * | 1/2011  | Guichard et al. .............. | 726/15   |

(Continued)

OTHER PUBLICATIONS

Cisco: IPv6 over MPLS Cisco IPv6 Provider Edge Router (6PE) Cisco IPv6 VPN Provider Edge Router (6VPE); 2006.*

(Continued)

*Primary Examiner* — Edan Orgad
*Assistant Examiner* — James Turchen
(74) *Attorney, Agent, or Firm* — Hanley, Flight and Zimmerman, LLC (57) ABSTRACT

Methods and apparatus to dynamically control access from VPNs to shared resources are disclosed. A disclosed example route reflector comprises a memory to implement a database, a user interface module to receive a request to permit access for a VPN to a shared resource, a BGP engine to process BGP advertisements, a network interface to receive a first BGP advertisement from a PE router associated with the VPN that includes a first RT associated with the VPN, and a shared resource access controller to update the database based on the request, to query the database to determine whether the VPN has access to the shared resource in response to the first BGP advertisement, and to direct the BGP engine to form a second BGP advertisement based on the first BGP advertisement that includes a second RT associated with the shared resource when the VPN has access to the shared resource.

20 Claims, 6 Drawing Sheets

(56) References Cited

U.S. PATENT DOCUMENTS

| | | | |
|---|---|---|---|
| 7,912,856 B2* | 3/2011 | Hannel et al. | 707/781 |
| 7,921,686 B2* | 4/2011 | Bagepalli et al. | 70/223 |
| 8,027,347 B2* | 9/2011 | Ould-Brahim | 370/397 |
| 8,064,440 B2* | 11/2011 | Bhaskar | 370/389 |
| 8,117,325 B1* | 2/2012 | Wu | 709/229 |
| 8,117,338 B2* | 2/2012 | Ould-Brahim | 709/242 |
| 8,121,118 B2 | 2/2012 | Satterlee et al. | |
| 2002/0181477 A1* | 12/2002 | Mo et al. | 370/401 |
| 2003/0016672 A1* | 1/2003 | Rosen et al. | 370/392 |
| 2003/0188001 A1* | 10/2003 | Eisenberg et al. | 709/229 |
| 2004/0148439 A1* | 7/2004 | Harvey et al. | 709/249 |
| 2005/0066053 A1* | 3/2005 | McDysan | 709/243 |
| 2006/0165087 A1* | 7/2006 | Page et al. | 370/395.3 |
| 2006/0168279 A1* | 7/2006 | Lee et al. | 709/230 |
| 2006/0168321 A1* | 7/2006 | Eisenberg et al. | 709/238 |
| 2006/0251088 A1* | 11/2006 | Thubert et al. | 370/401 |
| 2007/0133577 A1* | 6/2007 | Dong | 370/401 |
| 2007/0140250 A1* | 6/2007 | McAllister et al. | 370/392 |
| 2007/0140251 A1* | 6/2007 | Dong | 370/392 |
| 2007/0195800 A1* | 8/2007 | Yang et al. | 370/401 |
| 2007/0217419 A1* | 9/2007 | Vasseur | 370/392 |
| 2007/0280241 A1* | 12/2007 | Verma | 370/392 |
| 2008/0002697 A1* | 1/2008 | Anantharamaiah et al. | 370/392 |
| 2008/0049752 A1* | 2/2008 | Grant | 370/392 |
| 2008/0080517 A1* | 4/2008 | Roy et al. | 370/395.5 |
| 2010/0111093 A1* | 5/2010 | Satterlee et al. | 370/401 |

OTHER PUBLICATIONS

Van Der Merwe et al., "Dynamic Connectivity Management with an Intelligent Route Service Control Point," AT&T Labs, Proceedings of the 2006 SIGCOMM Workshop on Internet Network Management, held on Sep. 11-16, 2006 (6 pages).

Van Der Merwe et al., PowerPoint presentation of "Dynamic Connectivity Management with an Intelligent Route Service Control Point," AT&T Labs, Proceedings of the 2006 SIGCOMM Workshop on Internet Network Management, held on Sep. 11-16, 2006 (14 pages).

U.S. Appl. No. 12/262,675, filed Oct. 31, 2008, entitled, "Methods and Apparatus to Dynamically Control Connectivity Within Virtual Private Networks" (24 pages).

Rosen et al., "BGP/MPLS IP Virtual Private Networks (VPNs)," Network Working Group, RFC 4364, Feb. 2006, 47 pages.

United States Patent and Trademark Office, "Non-Final Office Action," issued in connection with U.S. Appl. No. 12/262,675, filed May 11, 2010 (12 pages).

United States Patent and Trademark Office, "Final Office Action," issued in connection with U.S. Appl. No. 12/262,675, filed Oct. 4, 2010 (21 pages).

United States Patent and Trademark Office, "Non-Final Office Action," issued in connection with U.S. Appl. No. 12/262,675, filed Apr. 15, 2011 (19 pages).

United States Patent and Trademark Office, "Notice of Allowance," issued in connection with U.S. Appl. No. 12/262,675, filed Oct. 17, 2011 (16 pages).

* cited by examiner

METHODS AND APPARATUS TO DYNAMICALLY CONTROL ACCESS FROM VIRTUAL PRIVATE NETWORKS TO NETWORK-BASED SHARED RESOURCES

FIELD OF THE DISCLOSURE

This disclosure relates generally to virtual private networks (VPNs) and, more particularly, to methods and apparatus to dynamically control access from VPNs to network-based shared resources.

BACKGROUND

Enterprise customers are increasingly adopting multiprotocol label switching (MPLS) based VPN services to implement a communication network among their respective customer sites via a service provider's network. Such MPLS-based VPNs provide direct any-to-any reachability among an enterprise's customer sites.

DETAILED DESCRIPTION

Example methods and apparatus to dynamically control access from virtual private networks (VPNs) to network-based shared resources are disclosed. A disclosed example route reflector includes a memory to implement a shared resource access control database, a user interface module to receive a request to permit access for a VPN to a network-based shared resource, a multi-protocol border gateway protocol (BGP) engine to process BGP advertisements, a network interface to receive a first BGP advertisement from a provider edge (PE) router associated with the VPN, the first BGP advertisement including a first route target (RT) associated with the VPN, and a shared resource access controller to update the shared resource access control database based on the request, to query the database to determine whether the VPN has access to the network-based shared resource in response to the first BGP advertisement, and to direct the multi-protocol BGP engine to form a second BGP advertisement based on the first BGP advertisement when the VPN has access to the network-based shared resource, the second BGP advertisement including a second RT associated with the network-based shared resource.

A disclosed example method includes receiving a first BGP advertisement from a network-based shared resource, the first BGP advertisement including a first RT associated with the network-based shared resource, automatically querying a shared resource access control database to determine whether a VPN has access to the network-based shared resource in response to the first BGP advertisement, forming a second BGP advertisement based on the first BGP advertisement when the VPN has access to the network-based shared resource, the second BGP advertisement including a second RT associated with the VPN, and broadcasting the second BGP advertisement.

In the interest of brevity and clarity, throughout the following disclosure references will be made to an example communication system 100 of FIG. 1. However, the methods and apparatus described herein to dynamically control access from VPNs to network-based shared resources are applicable to other types of networks constructed using other network technologies, topologies and/or protocols.

Figure 1:
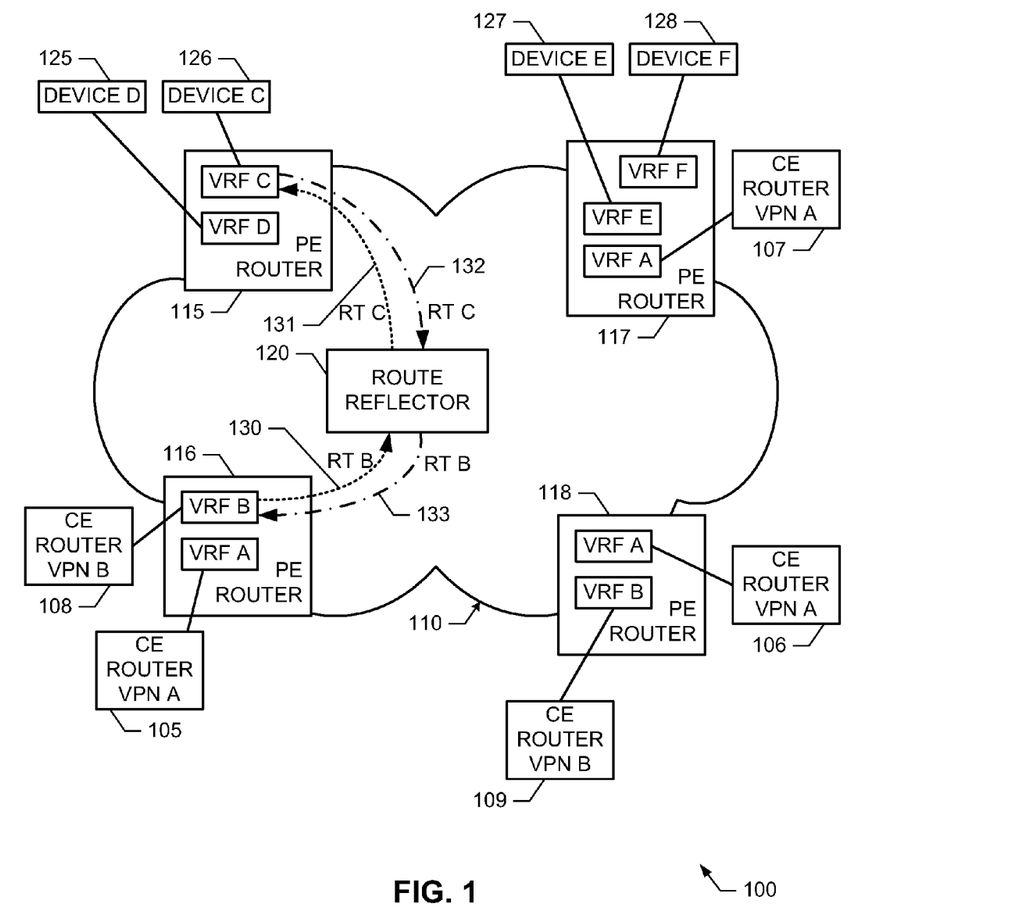
FIG. 1 is a schematic illustration of example communication system constructed in accordance with the teachings of this disclosure.

FIG. 1 illustrates the example communication system 100. To facilitate communication services between a plurality of customer edge (CE) routers, five of which are designated at reference numerals 105, 106, 107, 108, and 109, the example communication system 100 of FIG. 1 includes a multiprotocol label switching (MPLS) based service-provider network 110. In the illustrated example of FIG. 1, the example CE routers 105-107 are associated with a VPN A, and the example CE routers 108 and 109 are associated with a VPN B.

To route and/or transport data between and/or among the example CE routers 105-109, the example MPLS-based service-provider network 110 of FIG. 1 includes a plurality of PE routers, four of which are designated at reference numerals 115, 116, 117 and 118. The example PE routers 115-118 of FIG. 1 are communicatively coupled to each other via any number and/or type(s) of communication paths (not shown) that allow any particular PE router 115-118 to communicate with at least some, but not necessarily all of, the other PE routers 115-118.

For each VPN implemented by the MPLS-based service-provider network 110, each of the example PE routers 115-118 of FIG. 1 has a corresponding VPN routing and forwarding (VRF) table. For instance, for the VPN A the PE routers 115-118 have a VRF A, and for the VPN B the PE routers 115-118 have a VRF B. The VRF tables A and B are used by the PE routers 115-118 to route and/or forward a packet received at a particular PE router 115-118 to and/or toward its final destination. In general, when a packet is received at a PE router 115-118 from a CE router 105-109 associated with a particular VPN, the PE router 115-118 uses the final destination specified and/or identified in the packet to perform a query of the VRF table associated with that VPN. Based on a result of the query, the PE router 115-118 determines how the packet is to be routed or forwarded within the service provider network 110, and/or delivered to a particular CE router 105-109.

By sending, for example, BGP route advertisements, each of the example PE routers 115-118 of FIG. 1 publishes and/or exports information concerning the CE router(s) 105-109 that are communicatively coupled to the PE router 115-118. Isolation between different VPNs is achieved via RTs and import policies. Specifically, all routes of a particular VPN are tagged with an RT parameter and/or value associated with the VPN. For example, when the example PE router 116 sends a BGP advertisement containing information regarding the CE router 105 associated with VPN A that is communicatively coupled to the PE router 116, the BGP advertisement includes the RT A that is associated with VPN A. Based on received BGP route advertisements, the example PE routers 115-118 of FIG. 1 build, compile, update, maintain and/or construct a VRF table for each VPN. Specifically, when the example PE routers 115-118 receive BGP advertisements tagged with an RT associated with a particular VPN, they import those routes only into the VRF table associated with that VPN, as dictated by VPN's import policy.

To facilitate sharing of routing information among the example PE routers 115-118, the example service provider network 110 of FIG. 1 includes any number of route reflectors, route servers, intelligent route reflectors and/or intelligent route service control points, one of which is designated at reference numeral 120. Because not all of the example PE routers 115-118 are necessarily communicatively coupled in a full mesh topology (for example, when at least one PE router 115-118 does not have a direct communication path to another PE router 115-118), the example route reflector 120 of FIG. 1 forwards BGP advertisements among and/or to the PE routers 115-118. By forwarding each received BGP advertisement, the example route reflector 120 enables each of the PE routers 115-118 to build, compile and/or construct a VRF table for each VPN that can be used by the PE router 115-118 to route data from any CE router 105-109 of a particular VPN to any other CE router 105-109 of the VPN, even if such routing of data requires use of one or more intervening PE routers 115-118.

To dynamically control access from neither, either or both of the example VPNs A and B to network-based shared resources (four of which are designated at reference numerals 125, 126, 127 and 128), the example route reflector 120 of FIG. 1 forms a copy of a BGP advertisement that it receives, modifies the copy of the received BGP advertisement, and sends and/or broadcasts the modified BGP advertisement. The example route reflector 120 also forwards the received BGP advertisement without modification. For example, when devices of the example VPN B are to have access to the example shared device 126, and the example route reflector 120 of FIG. 1 receives a BGP advertisement 130 that includes the RT B, the example route reflector 120 broadcasts a version 131 of the BGP advertisement 130 that includes an RT C associated with the shared device 126. Likewise, when the example route reflector 120 receives a BGP advertisement 132 that includes the RT C, the example route reflector 120 broadcasts a version 133 of the BGP advertisement 131 that includes the RT B associated with the VPN. When a particular VPN is not to have access to a network-based shared resource 125-128, the route reflector 120 forwards the originally received BGP advertisements 130 and 132 without making, modifying and/or sending a copy of the received BGP advertisements 130 and/or 132.

Figure 4:
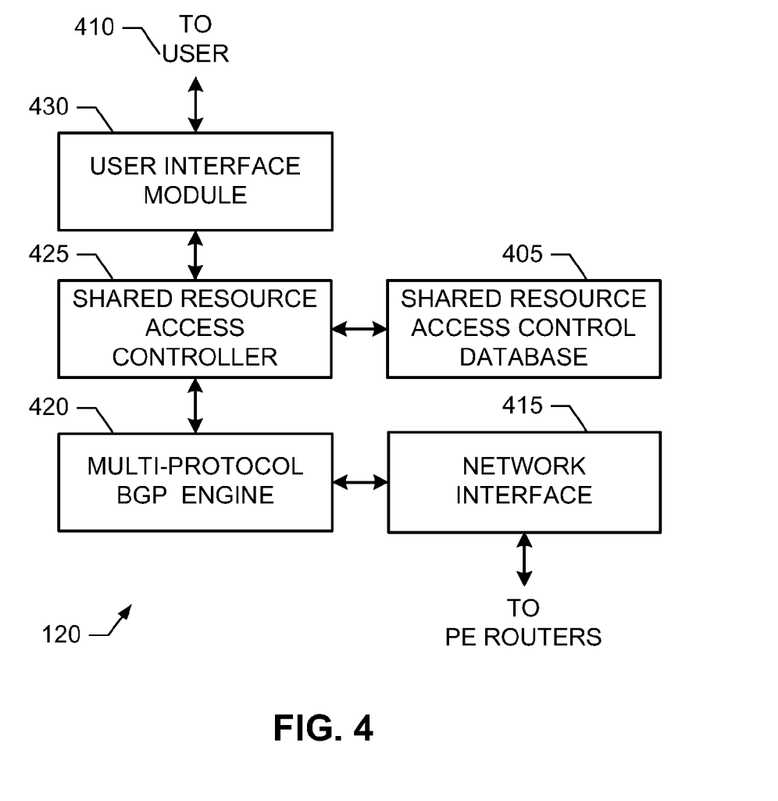
FIG. 4 illustrates an example manner of implementing a route reflector for any or all of the example communication systems of FIGS. 1-3.

To determine whether devices of a particular VPN are to have access to any of the network-based shared resources 125-128, the example route reflector 120 queries a shared resource control access database 405 (FIG. 4). An example manner of implementing the example route reflector 120 of FIG. 1 is described below in connection with FIG. 4. As described below in connection with FIG. 4, a user 410 can configure when and to which network-based shared resources 125-128 devices of a particular VPN have access.

Example network-based shared resources 125-128 include, but are not limited to, a network-based firewall, an Internet gateway, a cloud computing server, an application server, and/or distributed computing server. In the illustrated example of FIG. 2, a pair of network-based application accelerators 205 and 206 facilitate application acceleration via an acceleration tunnel 210. In the illustrated example of FIG. 3, a shared network address translation (NAT) server 305 facilitates the creation of an extranet between two different VPNs. In the illustrated examples of FIGS. 1-3, the shared resources 125-128 are not associated with and/or do not belong to either of the VPNs A and B. As such, the example router reflector 120 controls access from a particular VPN A, B to shared resources 125-128 that are logically outside of that VPN A, B.

Figure 2:
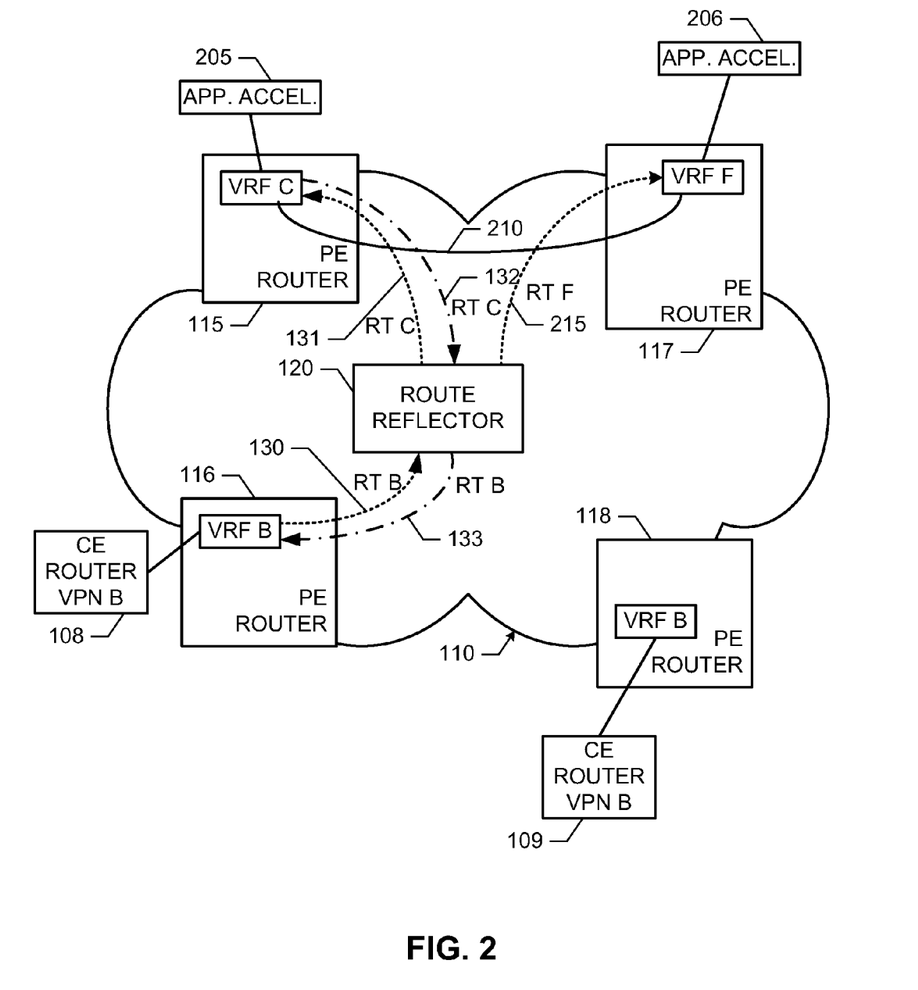
FIGS. 2 and 3 illustrate additional operational examples for the example communication system of FIG. 1.
Figure 3:
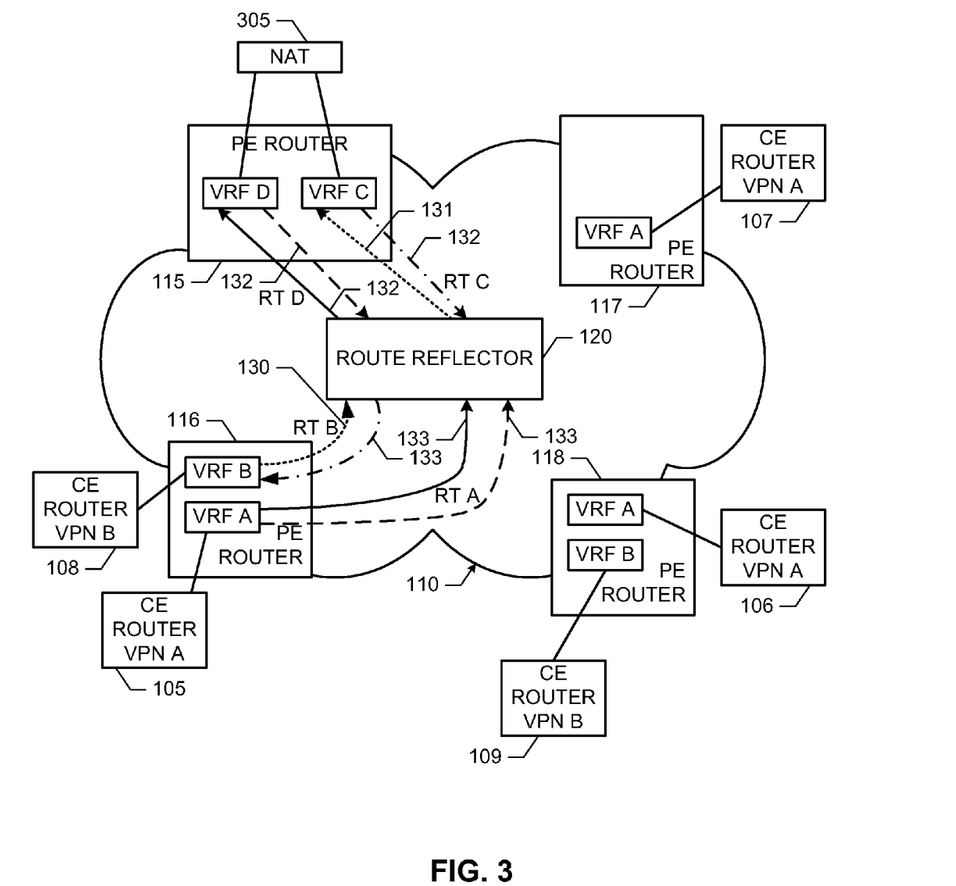

FIGS. 2 and 3 illustrate additional operational examples for the example communication system 100 of FIG. 1. Because elements of the illustrated examples of FIGS. 2 and 3 are identical to those discussed above in connection with FIG. 1, the descriptions of the identical elements are not repeated here. Instead, identical elements are designated with identical reference numerals in FIGS. 1-3, and the interested reader is referred back to the descriptions presented above in connection with FIG. 1 for a complete description of those like numbered elements.

In the illustrated example of FIG. 2, the example route reflector 120 creates, modifies and sends two copies of the BGP advertisement 130. A first copy 131 is modified to include the RT C associated with the first application accelerator 205. A second copy 215 is modified to include an RT F associated with the second application server 206. While not illustrated in FIG. 2, a BGP advertisement received from the second application server 206 would be copied, modified to include the RT B and broadcast. Similarly, BGP advertisements received from either of application servers 205 and 206 would be copied, modified to include the other application server's RT and broadcast, thereby allowing the application servers 205 and 206 to communicate. In the example of FIG. 2, the application servers 205 and 206 establish the example application acceleration tunnel 210 through the MPLS-based service-provider network 110. The example application acceleration tunnel 210 of FIG. 2 is used to accelerate applications between the example CE routers 108 and 109.

In the illustrated example of FIG. 3, both of the example VPNs A and B have access to the example NAT server 305. The example NAT server 305 of FIG. 3 is associated with two different RTs C and D that allow the two VPNs A and B to have separate access to the NAT server 305 at the PE router 115 without the two VPNs becoming communicatively coupled at and/or by any of the other PE routers 116-118. That is, the example route reflector 120 associates the example VPN A with the NAT server 305 via a first RT D of the NAT server 305, and the example VPN B with the NAT server 305 via a second RT C of the NAT server 305, as shown in FIG. 3. Via the example NAT server 305, devices of the VPNs A and B are able to communicate. For example, data packets transmitted via the example CE router 105 that are destined for a device communicatively couple to the example CE router 109 are routed to the NAT server 305 where appropriate address translation occurs, and then the modified packets are forwarded by the NAT server 305 to the CE router 109 for delivery to the destination device.

While example communication systems have been illustrated in FIGS. 1-3, one or more of the interfaces, data structures, elements, processes and/or devices illustrated in FIGS. 1-3 may be combined, divided, re-arranged, omitted, eliminated and/or implemented in any other way. Further, the example PE routers 115-118 and/or the example route reflector 120 of FIGS. 1-3 may be implemented by hardware, software, firmware and/or any combination of hardware, software and/or firmware. Thus, for example, any of the example PE routers 115-118 and/or the example route reflector 120 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, a communication system may include interfaces, data structures, elements, processes and/or devices instead of, or in addition to, those illustrated in FIGS. 1-3 and/or may include more than one of any or all of the illustrated interfaces, data structures, elements, processes and/or devices.

FIG. 4 illustrates an example manner of implementing the example route reflector 120 of FIGS. 1-3. To implement one or more interfaces to the example PE routers 115-118, the example route reflector 120 of FIG. 4 includes any number and/or type(s) of network interfaces, one of which is designated at reference numeral 415.

To send, receive and process BGP route advertisements, the example route reflector 120 of FIG. 4 includes a multi-protocol BGP engine 420. When a BGP route advertisement is received from a PE router 115-118 via the example network interface 415, the example multi-protocol BGP engine 420 of FIG. 4 forwards the received BGP route advertisement to the other PE routers 115-118. The example multi-protocol BGP engine 420 also queries a shared resource access controller 425 to determine whether one or more modified copies of the received BGP router advertisement are to be broadcast.

To control the access from VPNs to network-based shared resources, the example route reflector 120 of FIG. 4 includes the example shared resource access controller 425. When queried by the example multi-protocol BGP engine 420, the example shared resource access controller 425 of FIG. 4 queries the example shared resource access control database 405 to determine whether BGP advertisements associated with a first RT are to be re-broadcast with a second RT. When such access to network-based shared resources is enabled for a particular RT, the example shared resource access controller 425 returns to the multi-protocol BGP engine 420 the one or more additional RTs with which the received BGP route advertisement is to be broadcast.

In response to the one or more additional RTs, the example multi-protocol BGP engine 420 of FIG. 4 creates corresponding copies of the received BGP advertisement, modifies the associated RT to correspond with a respective one of the one or more additional RTs, and broadcasts the modified copy(-ies) of the received BGP advertisement.

Access control information may be stored in the example shared resource access control database 405 using any number and/or type(s) of data structures. An example data structure that may be used to implement the example shared resource control access database 405 of FIG. 4 is described below in connection with FIG. 5. The example shared resource control access database 405 may be stored using any number and/or type(s) of memory(-ies), memory device(s) and/or storage device(s).

To allow a user 410 to configure access to network-based shared resources for a VPN, the example route reflector 120 of FIG. 4 includes any number and/or type(s) of user interface modules, one of which is designated at reference numeral 430. The example user 410 of FIG. 4 may be associated with a particular VPN, be associated with an operator of the MPLS-based service-provider network 110, and/or be associated with a particular network-based shared resource. The example user interface module 430 of FIG. 4 enables the user 410 to interact with the example shared resource access controller 425 to update the database 405 to configure access to network-based shared resources for a VPN. In some examples, access to shared resources can be configured for a particular period of time. For instance, an extranet between two VPNs can be temporarily configured for a particular length of time and then be automatically terminated by the example shared resource access controller 425. Example user interface modules 430 include, but are not limited to, a web-based interface, a voice activated response system and/or an application programming interface accessible to another computer system.

While an example route reflector 120 has been illustrated in FIG. 4, one or more of the interfaces, data structures, elements, processes and/or devices illustrated in FIG. 4 may be combined, divided, re-arranged, omitted, eliminated and/or implemented in any other way. Further, the example shared resource access control database 405, the example network interface 415, the example multi-protocol BGP engine 420, the example shared resource access controller 425, the example user interface module 430, and/or, more generally, the example route reflector 120 of FIG. 4 may be implemented by hardware, software, firmware and/or any combination of hardware, software and/or firmware. Thus, for example, any or the example shared resource access control database 405, the example network interface 415, the example multi-protocol BGP engine 420, the example shared resource access controller 425, the example user interface module 430, and/or, more generally, the example route reflector 120 may be implemented by one or more circuit(s), programmable processor(s), ASIC(s), PLD(s) and/or FPLD(s), etc. Further still, a route reflector may include interfaces, data structures, elements, processes and/or devices instead of, or in addition to, those illustrated in FIG. 4 and/or may include more than one of any or all of the illustrated interfaces, data structures, elements, processes and/or devices.

Figure 5:
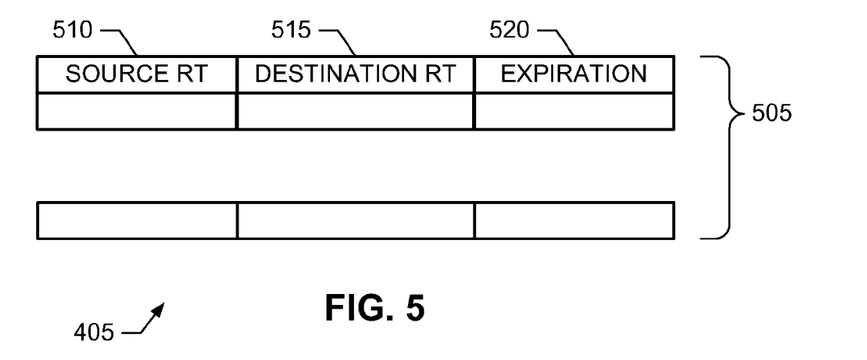
FIG. 5 illustrates an example data structure that may be used to implement a shared resource access control database for the example route reflector of FIG. 4.

FIG. 5 illustrates an example data structure that may be used to implement the example shared resource access control database 405 of FIG. 4. The example data structure of FIG. 5 includes a plurality of entries 505 for respective ones of a plurality of RTs supported by the example MPLS-based service-provider network 110. To identify a source RT, each of the example entries 505 of FIG. 5 includes source RT field 510. The example source RT field 510 of FIG. 5 contains one or more values and/or strings that uniquely identifies an RT.

To identify the RT associated with another VPN to which the VPN associated with the source RT 510 is to be coupled, each of the example entries 505 of FIG. 5 includes a destination RT field 515. The example destination RT field 515 of FIG. 5 contains one or more values and/or strings that uniquely identify one or more RTs.

When a BGP advertisement is received, the example database 405 of FIG. 5 can be queried to determine whether any of the source RT fields 510 contains the RT associated with the received BGP advertisement. If an entry 505 is thus located, the example shared resource access controller 425 returns the one or more RTs listed in the destination RT field 515 associated with the identified entry 505 to the multi-protocol BGP engine 420.

To store an expiration date and/or time for configured access from a VPN to a shared resource, each of the example entries 505 of FIG. 5 includes an expiration field 520. The example expiration field 520 of FIG. 5 includes one or more values and/or strings that identify when the corresponding entry 505 is no longer valid.

While an example data structure that may be used to implement the example shared resource access control database 405 of FIG. 4 is illustrated in FIG. 5, the example data structure of FIG. 5 may be implemented using any number and/or type(s) of other and/or additional entries, fields and/or data. Further, the entries, fields and/or data illustrated in FIG. 5 may be combined, divided, re-arranged, eliminated and/or implemented in any way. Further still, the example data structures may include entries, fields and/or data in addition to, or instead of, those illustrated in FIG. 5, and/or may include more than one of any or all of the illustrated entries, fields and/or data. Moreover, the example data structure 405 of FIG. 5 may be queried using any additional and/or alternative methods.

Figure 6:
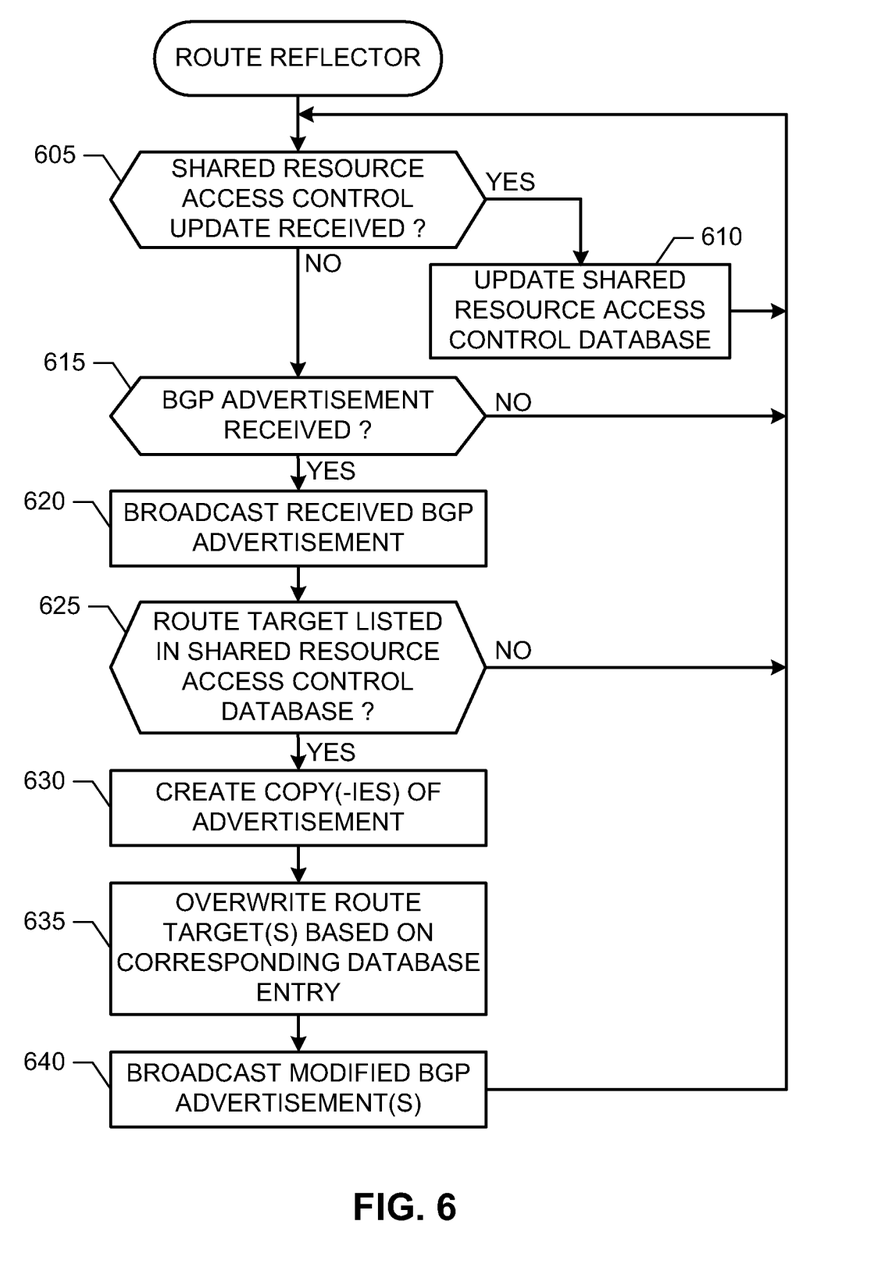
FIG. 6 is a flowchart representative of an example process that may be carried out to implement the example route reflectors of FIGS. 1, 2, 3 and/or 4.

FIG. 6 illustrates a flowchart representative of an example process that may be carried out to implement any or all of the example route reflectors 120 of FIGS. 1-4. The example process of FIG. 6 may be carried out by a processor, a controller and/or any other suitable processing device. For example, the example process of FIG. 6 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be accessed by a processor, a general-purpose or special-purpose computer, or other machine with a processor (e.g., the example processor platform P100 discussed below in connection with FIG. 7). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example process of FIG. 6 may be implemented using any combination(s) of ASIC(s), PLD(s), FPLD(s), discrete logic, hardware, firmware, etc. Also, some or all of the example process of FIG. 6 may instead be implemented manually or as any combination of any of the foregoing techniques, for example, any combination of firmware, software, discrete logic and/or hardware. Further, many other methods of implementing the example operations of FIG. 6 may be employed. For example, the order of execution of the blocks may be changed, and/or one or more of the blocks described may be changed, eliminated, sub-divided, or combined. Additionally, any or all of the example process of FIG. 6 may be carried out sequentially and/or carried out in parallel by, for example, separate processing threads, processors, devices, discrete logic, circuits, etc.

The example process of FIG. 6 begins with the example user interface module 430 of FIG. 4 determining whether updated shared resource control information has been received (block 605). If updated shared resource control information has been received (block 605), the example shared resource access controller 425 makes corresponding updates the example shared resource access control database 405 (block 610). Control then returns to block 605.

If updated shared resource control information was not received (block 605), the example multi-protocol BGP engine 420 of FIG. 4 determines whether a BGP advertisement was received via the example network interface 415 (block 615). If a BGP advertisement was not received (block 615), control returns to block 605.

If a BGP advertisement was received (block 615), the multi-protocol BGP engine 420 broadcasts the received BGP advertisement (block 620). The multi-protocol BGP engine 420 queries the shared resource access controller 425 to determine whether modified copies of the received BGP advertisement are to be broadcast (block 625). If the shared resource access controller 425 determines that no modified copies of the received BGP advertisement are to be broadcast (block 625), control returns to block 605.

If based on a query of the example shared resource access control database 405, the shared resource access controller 425 returns one or more RTs (block 625), the multi-protocol BGP engine 420 creates one or more corresponding copies of the received BGP advertisement (block 630), modifies the RT of the copy(-ies) with respective ones of the returned RT(s) (block 635), and broadcasts the modified BGP advertisement(s) (block 640). Control then returns to block 605.

Figure 7:
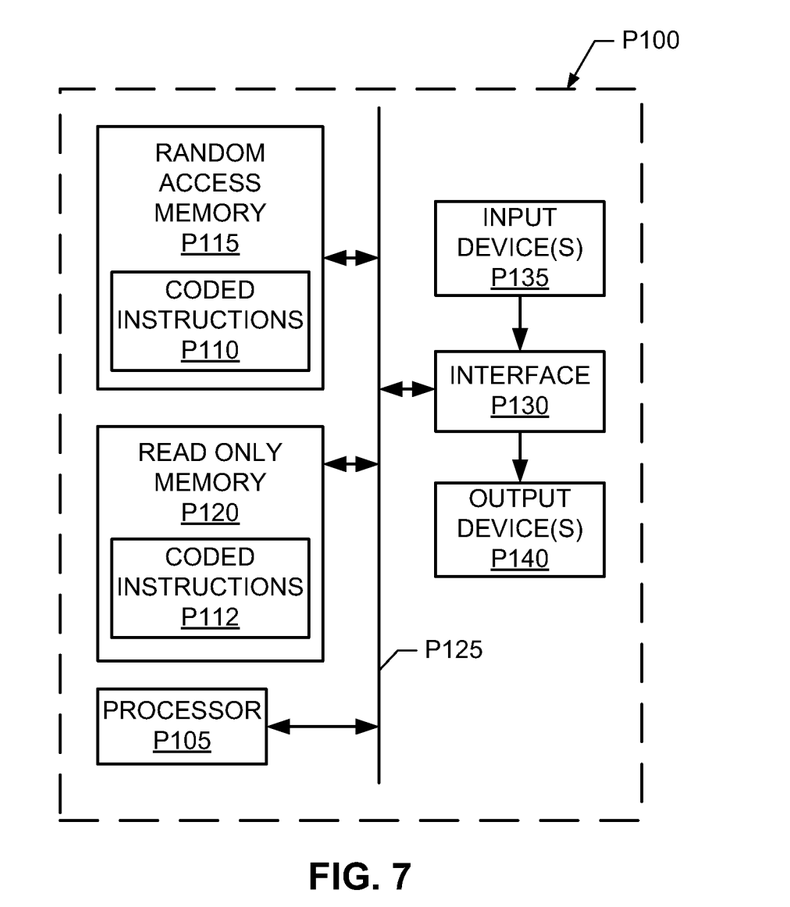
FIG. 7 is a schematic illustration of an example processor platform that may be used and/or programmed to carry out the example process of FIG. 6 and/or to implement any of all of the methods and apparatus disclosed herein.

FIG. 7 is a schematic diagram of an example processor platform P100 that may be used and/or programmed to implement any or all of the example route reflectors 120 of FIGS. 1-4. For example, the processor platform P100 can be implemented by one or more general-purpose processors, processor cores, microcontrollers, etc.

The processor platform P100 of the example of FIG. 7 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example process of FIG. 6 to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example shared resource access control database 405 of FIG. 4.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the network interface 415 of FIG. 4.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A route reflector comprising:
   a memory to implement a shared resource access control database;
   a user interface module to receive a request to permit access for a first virtual private network to a network-based shared resource;
   a multi-protocol border gateway protocol engine to process border gateway protocol advertisements;
   a network interface to receive a first border gateway protocol advertisement from a first provider edge router associated with the first virtual private network, the first border gateway protocol advertisement including a first route target associated with the first virtual private network; and
   a shared resource access controller to update the shared resource access control database based on the request, to query the database to determine whether the first virtual private network has access to the network-based shared resource in response to the first border gateway protocol advertisement, and to direct the multi-protocol border gateway protocol engine to form a second border gateway protocol advertisement based on the first border gateway protocol advertisement when the first virtual private network has access to the network-based shared resource, the second border gateway protocol advertisement including a second route target associated with the network-based shared resource, wherein the network interface is to send the second border gateway protocol advertisement to a second provider edge router associated with a second virtual private network, wherein the route reflector is separate from the first provider edge router and the second provider edge router.

2. The route reflector as defined in claim 1, wherein the network interface is to broadcast the second border gateway protocol advertisement and to broadcast the first border gateway protocol advertisement.

3. The route reflector as defined in claim 1, wherein the network interface is to receive a third border gateway protocol advertisement from the network-based shared resource, the third border gateway protocol advertisement including the second route target, and wherein the shared resource access controller is to query the database to determine whether the virtual private network has access to the network-based shared resource in response to the third border gateway protocol advertisement, and when the virtual private network has access to the network-based shared resource direct the multi-protocol border gateway protocol engine to form a fourth border gateway protocol advertisement based on the third border gateway protocol advertisement, the third border gateway protocol advertisement including the first route target.

4. The route reflector as defined in claim 1, wherein the network-based shared resource comprises a network-based firewall.

5. The route reflector as defined in claim 1, wherein the network-based shared resource comprises an Internet gateway.

6. The route reflector as defined in claim 1, wherein the network-based shared resource comprises an application accelerator.

7. The route reflector as defined in claim 1, wherein the network-based shared resource comprises a network address translation server.

8. The route reflector as defined in claim 1, wherein the network-based shared resource comprises at least one of a cloud computing server, an application server, or a distributed computing server.

9. A method comprising:
receiving at a route reflector a first border gateway protocol advertisement from a network-based shared resource associated with a first virtual private network, the first border gateway protocol advertisement including a first route target associated with the network-based shared resource;
automatically querying a shared resource access control database to determine whether a second virtual private network has access to the network-based shared resource in response to the first border gateway protocol advertisement;
forming a second border gateway protocol advertisement based on the first border gateway protocol advertisement when the second virtual private network has access to the network-based shared resource, the second border gateway protocol advertisement including a second route target associated with the second virtual private network; and broadcasting the second border gateway protocol advertisement to a provider edge router associated with the second virtual private network, wherein the route reflector is separate from the network-based shared resource and the provider edge router.

10. The method as defined in claim 9, further comprising:
receiving a request to permit access for the second virtual private network to the network-based shared resource; and
updating the shared resource access control database in response to the request.

11. The method as defined in claim 9, further comprising broadcasting a copy of the first border gateway protocol advertisement.

12. The method as defined in claim 9, wherein forming the second border gateway protocol advertisement based on the first border gateway protocol advertisement comprises:
forming a copy of the first border gateway protocol advertisement; and
modifying a parameter having a first value representing the first route target with a second value representing the second route target.

13. The method as defined in claim 9, further comprising:
receiving a third border gateway protocol advertisement from the provider edge router associated with the second virtual private network, the third border gateway protocol advertisement including the second route target;
automatically querying the shared resource access control database to determine whether the second virtual private network has access to the network-based shared resource in response to the third border gateway protocol advertisement;
forming a fourth border gateway protocol advertisement based on the third border gateway protocol advertisement when the second virtual private network has access to the network-based shared resource, the fourth border gateway protocol advertisement including the first route target; and
broadcasting the fourth border gateway protocol advertisement.

14. The method as defined in claim 9, wherein the network-based shared resource comprises at least one of a network-based firewall, an Internet gateway, an application accelerator, a network address translation server, a cloud computing server, an application server, or a distributed computing server.

15. A computer-readable storage device storing machine readable instructions that, when executed, cause a machine to:
receive at a route reflector a first border gateway protocol advertisement from a network-based shared resource associated with a first virtual private network, the first border gateway protocol advertisement including a first route target associated with the network-based shared resource;
automatically query a shared resource access control database to determine whether a second virtual private network has access to the network-based shared resource in response to the first border gateway protocol advertisement;
form a second border gateway protocol advertisement based on the first border gateway protocol advertisement when the second virtual private network has access to the network-based shared resource, the second border gateway protocol advertisement including a second route target associated with the second virtual private network; and broadcast the second border gateway protocol advertisement to a provider edge router associated with the second virtual private network, the route reflector being separate from the network-based shared resource and the provider edge router.

16. The computer-readable storage device as defined in claim 15, wherein the machine readable instructions, when executed, cause the machine to:
receive a request to permit access for the second virtual private network to the network-based shared resource; and
update the shared resource access control database in response to the request.

17. The computer-readable storage device as defined in claim 15, wherein the machine readable instructions, when executed, cause the machine to broadcast a copy of the first border gateway protocol advertisement.

18. The computer-readable storage device as defined in claim 15, wherein the machine readable instructions, when executed, cause the machine to form the second border gateway protocol advertisement based on the first border gateway protocol advertisement by:
forming a copy of the first border gateway protocol advertisement; and
modifying a parameter having a first value representing the first route target with a second value representing the second route target.

19. The computer-readable storage device as defined in claim 15, wherein the machine readable instructions, when executed, cause the machine to:
receive a third border gateway protocol advertisement from the provider edge router associated with the second virtual private network, the third border gateway protocol advertisement including the second route target;
automatically query the shared resource access control database to determine whether the second virtual private network has access to the network-based shared resource in response to the third border gateway protocol advertisement;
form a fourth border gateway protocol advertisement based on the third border gateway protocol advertisement when the second virtual private network has access to the network-based shared resource, the fourth border gateway protocol advertisement including the first route target; and
broadcasting the fourth border gateway protocol advertisement.

20. The computer-readable storage device as defined in claim 15, wherein the network-based shared resource comprises at least one of a network-based firewall, an Internet gateway, an application accelerator, a network address translation server, a cloud computing server, an application server, or a distributed computing server.

* * * * *